US011919347B2

United States Patent
B Mohd Talib et al.

(10) Patent No.: US 11,919,347 B2
(45) Date of Patent: Mar. 5, 2024

(54) COIL SPRING FOR VEHICLE SUSPENSION SYSTEM

(71) Applicant: APM Engineering and Research Sdn. Bhd., Petaling Jaya (MY)

(72) Inventors: Muhammad Ridhwan B Mohd Talib, Petaling Jaya (MY); Kok Wui Bon, Petaling Jaya (MY); Ming Sheng Tan, Petaling Jaya (MY); Kar Chun Wong, Petaling Jaya (MY)

(73) Assignee: APM Engineering and Research Sdn. Bhd., Petaling Jaya (MY)

( * ) Notice: Subject to any disclaimer, the term of this patent is extended or adjusted under 35 U.S.C. 154(b) by 0 days.

(21) Appl. No.: 17/698,772

(22) Filed: Mar. 18, 2022

(65) Prior Publication Data

US 2023/0001758 A1    Jan. 5, 2023

(30) Foreign Application Priority Data

Jul. 5, 2021 (MY) .............................. PI2021003817

(51) Int. Cl.
  *B60G 11/14*     (2006.01)
  *F16F 1/04*      (2006.01)

(52) U.S. Cl.
  CPC ............... *B60G 11/14* (2013.01); *F16F 1/04* (2013.01)

(58) Field of Classification Search
  CPC ................................ F16F 1/04; F16F 1/047
  USPC ................................................ 267/179, 180
  See application file for complete search history.

(56) References Cited

U.S. PATENT DOCUMENTS

| | | | | |
|---|---|---|---|---|
| 3,160,406 A | * | 12/1964 | Dickinson | F16F 1/04 267/221 |
| 4,903,985 A | * | 2/1990 | Muhr | B60G 11/14 267/180 |
| 9,770,957 B2 | | 9/2017 | Sano et al. | |
| 10,144,261 B2 | | 12/2018 | Nishizawa | |
| 2002/0105127 A1 | * | 8/2002 | Imaizumi | B60G 15/068 267/195 |
| 2003/0111781 A1 | * | 6/2003 | Imaizumi | F16F 1/041 267/166 |
| 2007/0013161 A1 | * | 1/2007 | Rhein | B60G 11/14 280/124.162 |
| 2007/0120303 A1 | * | 5/2007 | Rhein | F16F 1/12 267/248 |
| 2018/0215224 A1 | * | 8/2018 | Nishizawa | B60G 11/16 |
| 2018/0215226 A1 | * | 8/2018 | Nishizawa | F16F 1/08 |

* cited by examiner

*Primary Examiner* — Melanie Torres Williams
(74) *Attorney, Agent, or Firm* — Preston Smirman; SMIRMAN IP LAW, PLLC

(57) ABSTRACT

A coil spring includes an elongated body (10) formed by a plurality of continuous coils (21, 31), and the body (10) includes an upper section (20) and a lower section (30), wherein pitches (22) and coil angles (23) of the coils (21) in the upper section (20) are consistent to form an upright profile (24) for the upper section (20), and wherein pitches (32) and coil angles (33) of two or more coils (31) at a free end of the lower section (30) is differed from the pitches (22) and the coil angles (23) of the coils (21) in the upper section (20) to form a gradually curved profile (34) for the lower section (30).

4 Claims, 3 Drawing Sheets

Fig. 1 [PRIOR ART]

COIL SPRING FOR VEHICLE SUSPENSION SYSTEM

CROSS-REFERENCE TO RELATED APPLICATION

The instant application claims priority to Malaysia Patent Application Serial No. PI2021003817 filed Jul. 5, 2021, the entire specification of which is expressly incorporated herein by reference.

FIELD OF THE INVENTION

The invention relates to a coil spring. More particularly, the invention relates to a new configuration of a coil spring for use in a MacPherson strut type of vehicle suspension system.

BACKGROUND OF THE INVENTION

A basic vehicle suspension system usually consists of coil springs, axles, shock absorbers, arms rods and ball joints. The main function of the coil springs are to absorb shocks from road and store the shocks in the form of compressed energy which is later dissipated by the shock absorbers. Therefore, the coil springs is one of the important elements in the vehicle suspension system to provide a smooth and comfortable driving experience. A coil spring is made from a single length of metal wire which is heated and wound on a former to product a generally cylindrical body. Such body can be twisted, compressed, or stretched by a load and still return to its original shape when the load is released. The capability of a coil spring in handling different load sizes from different angles or directions are determined by diameter of the wire, overall body diameter of the coil spring, its shape, pitches and coil angles of the coils.

FIG. 1 shows a few existing shapes of coil springs which are known to control and absorb lateral forces caused by the geometric shape of the vehicle suspension system. Nevertheless, these existing shapes has their respective drawbacks as follows: the coil spring in a straight configuration has less capability in handling lateral forces, and it may not meet the requirements of certain vehicles; the C-shape, S shape and L-shape coil springs may enough capability in handling lateral forces but these kinds of complex spring profiles need to be controlled properly along the coil in order to avoid interference between coils and thereby limits the freedom of design of the vehicle suspension system as such coil spring's design occupies more enveloping space.

Patent document U.S. Pat. No. 9,770,957 discloses a suspension coil spring that is to be installed between an upper side pedestal and a lower side pedestal of a strut type suspension for a vehicle includes a coil spring main body such that, in an installation state, an upper coil end is disposed on the upper side pedestal and a lower coil end is disposed on the lower side pedestal, the upper side pedestal and the upper coil end contact at two upper contact points, and the lower side pedestal and the lower coil end contact at one lower contact point. The two upper contact points are separated in a front-to-rear direction of the vehicle. The one lower contact point is disposed at a position that is in a direction toward outside the vehicle from a plane that passes through the two upper contact points and that is parallel to a coil central axis.

Another patent document U.S. Ser. No. 10/144,261 discloses a coil spring includes a lower end turn portion which is in contact with a lower spring seat, an upper end turn portion which is in contact with an upper spring seat, and an effective portion between the lower end turn portion and the upper end turn portion. The coil spring is cylindrical about an axis of the effective portion in its free shape which is not compressed. Further, with respect to a coordinate system in which a force line is assumed as a Z-axis, the coil spring is cylindrical with a constant pitch in a direction along the Z-axis in its compressed shape which is compressed to a specified height.

Therefore, it would be desirable to provide an alternative configuration for the coil spring to solve the above mentioned problem. This invention provides such a coil spring.

SUMMARY OF THE INVENTION

In one aspect of the invention, there is provided a coil spring comprises an elongated body formed by a plurality of continuous coils, and the body includes an upper section and a lower section; wherein pitches and coil angles of the coils in the upper section are generally consistent to form an upright profile for the upper section; and wherein coil angles and pitches of two or more coils at a free end of the lower section is differed from the pitches and the coil angles of the coils in the upper section to form a gradually curved profile for the lower section.

Preferably, the upper section and lower section can form a J-shape body.

Preferably, the coil angles of the two or more coils at the free end of the lower section can be greater than the coil angles of the coils in the upper section.

Preferably, each coil angles of the two or more coils at the free end of the lower section can be differed from each other.

Preferably, the pitches of the two or more coils at the free end of the lower section can be greater than the pitches of the coils in the upper section.

Preferably, each pitch of the two or more coils at the free end of the lower section can be differed from each other.

In another aspect of the invention, there is provided a front vehicle suspension system comprises a coil spring having an elongated body formed by a plurality of continuous coils, and the body includes an upper section and a lower section; wherein pitches and coil angles of the coils in the upper section are consistent to form an upright profile for the upper section; and wherein coil angles and pitches of two or more coils at a free end of the lower section is differed from the pitches and the coil angles of the coils in the upper section to form a gradually curved profile for the lower section.

One skilled in the art will readily appreciate that the invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

DETAILED DESCRIPTION OF THE INVENTION

The invention will now be described in greater detail, by way of example, with reference to the drawings.

Figure 1:
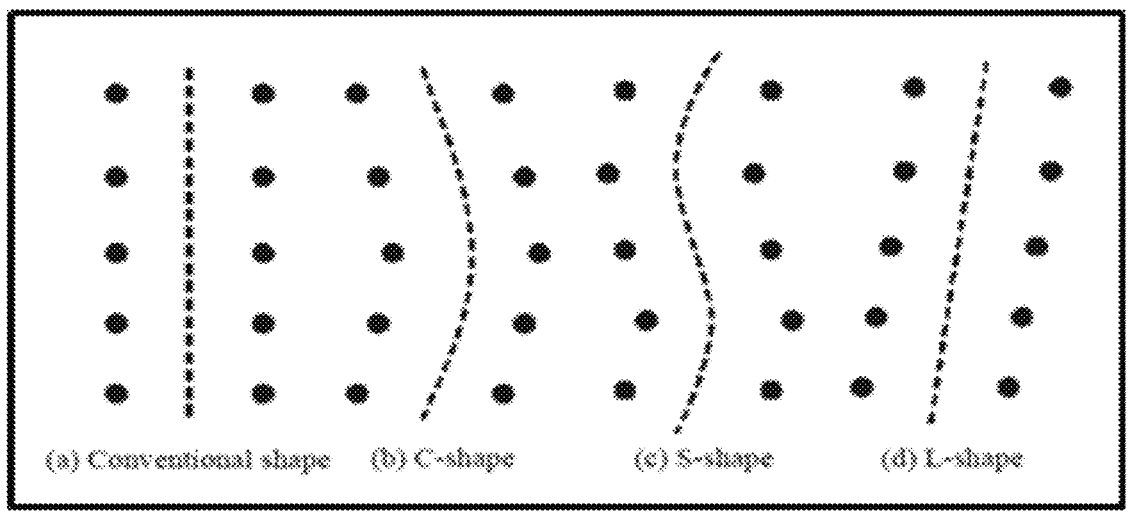
FIG. 1 illustrates conventional spring and existing shapes of coil springs which are known to control the lateral force, in accordance with the prior art.
Figure 2:
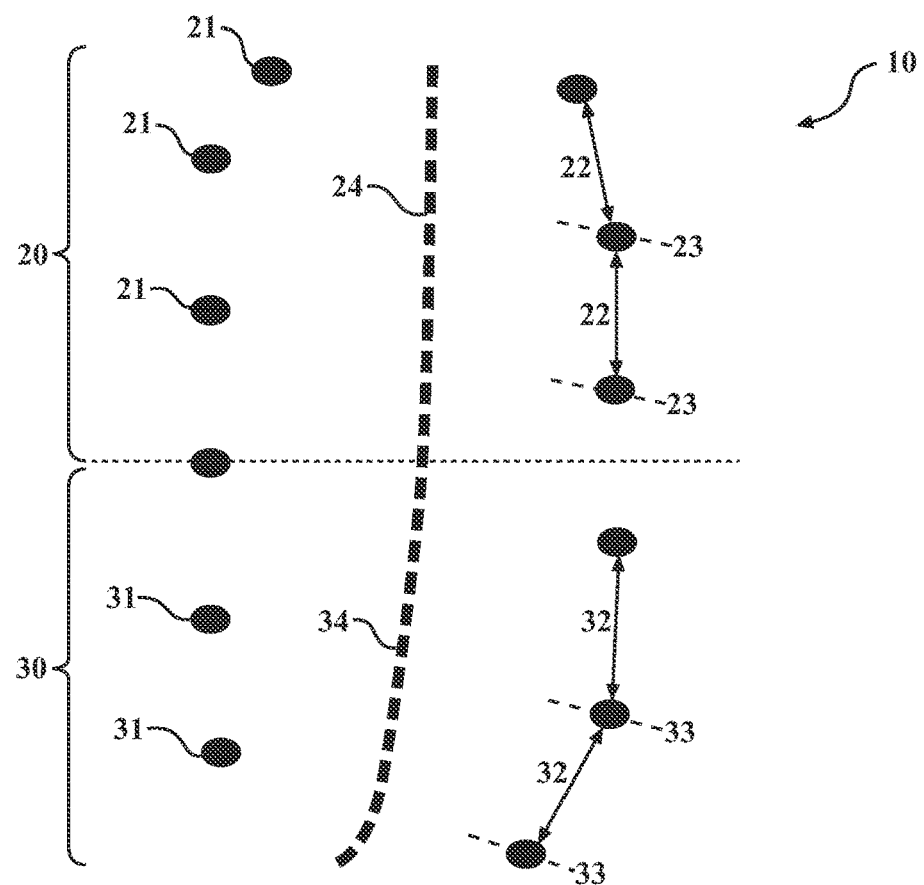
FIG. 2 is a cross section diagram of a coil spring in J-shape configuration, in accordance with the general teachings of the present invention.

Referring to FIG. 2, a coil spring as illustrated therein comprises a body (10) of a generally cylindrical shape, being formed by a single wire that is wounded into a plurality of continuous coils (21, 31). The body (10) can be categorized into an upper section (20) having a plurality of helical coils (21) and a lower section (30) having a plurality of helical coils (31). The coil spring can be characterised by the following: (i) pitches (22) and coil angles (23) of the helical coils (21) in the upper section (20) are consistent with each other to form an upright profile (24) for the upper section (20); (ii) pitches (32) and coil angles (33) of two or more helical coils (31) at a free end of the lower section (30) is differed from the pitches (22) and the coil angles (23) of the helical coils (21) in the upper section (20) to form a gradually curved profile (34) for the lower section (30). When the upper section and lower section is combined, the body (10) forms a J-shape profile.

By way of example, the pitches (32) and coil angles (33) of the two or more helical coils (31) at the free end of the lower section is respectively greater than the pitches (22) and the coil angles (23) of the helical coils (21) in the upper section (20). In addition to that, the pitches (32) and coil angles (33) of the two or more helical coils in the lower section (20) may gradually increase in a direction towards the free end of the lower section (30) to form the curve profile (34) which gradually moves further away from an axial of the coil spring.

In operation, the coil spring is used in a vehicle suspension system. Preferably, the vehicle suspension system is a MacPherson strut type suspension system for front wheels of a vehicle. Nonetheless, it should be noted that the coil spring can also be applied in any other vehicle suspension systems which absorption of lateral force is required. In the example of the MacPherson strut type suspension system, the coil spring is disposed at a position of a shock absorber that surrounds the shock absorber, and the coil spring is being held in place by a pair of collars on a strut. The strut is angled and thereby giving rise to lateral forces which required to be damped by the shock absorber. The coil spring absorbs the lateral force in the form of compressed energy which is later dissipated by the shock absorber.

Figure 3:
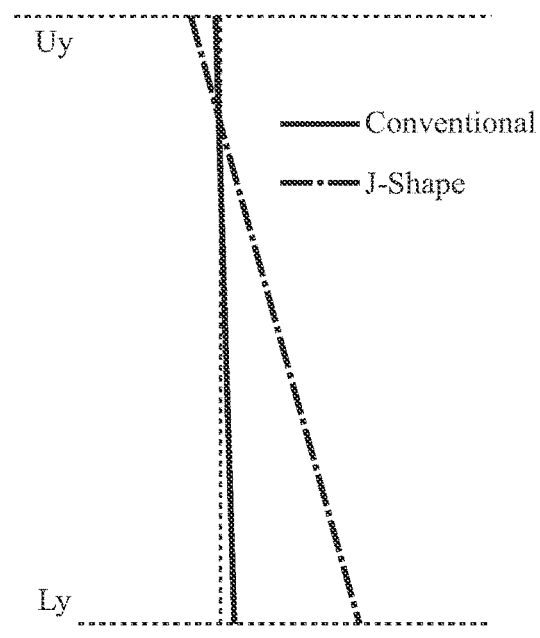
FIG. 3 is a diagram illustrating a comparison of lateral force generated absorption capability of an upper section and lower section of a J-shape spring and a conventional spring, in accordance with the general teachings of the present invention.

Characteristics of the J-shape coil spring in terms of load axis formed by the lateral force generated is illustrated in FIG. 3. It produces higher lateral force significantly compare to a conventional spring. The lateral force generated at the lower section (30) is much higher than upper section (20) of the coil spring. Most of the passenger vehicles nowadays require higher lateral force at the lower section due to improvement made on the positioning of the suspension system to fit with the limited enveloping space.

Figure 4:
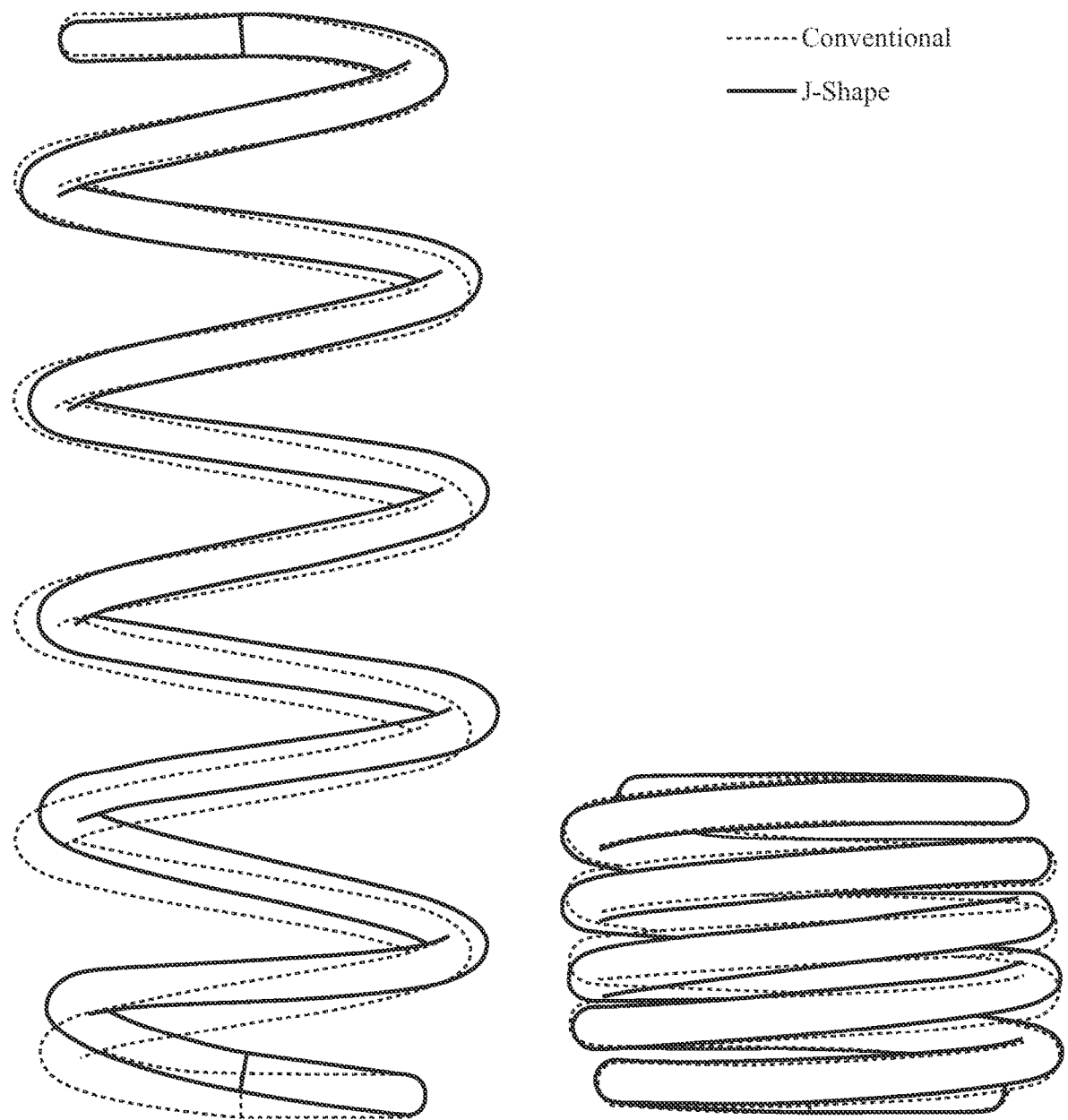
FIG. 4 is a comparison diagram between the J-shape coil spring and a conventional coil spring at uncompressed state and compressed state, in accordance with the general teachings of the present invention.

As shown in FIG. 4, the J-shape coil spring in both compressed state and uncompressed state has an overall width which is almost identical to a coil spring in a straight configuration. As a result, the J-shape coil spring is capable of generating greater lateral force and maintaining even gap between coils especially at the lower section (20). Thus, it does not occupy more space than the conventional coil spring. The helical coils (21, 31) in the compressed state are also in even gap and no interference between coils. It is a design rule to avoid such interference during stroke to avoid continuous knocking between coils which will affect the coil spring life.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

What is claimed is:

1. A coil spring for use in a vehicle suspension system, comprising:
    an elongated body formed by a plurality of continuous coils;
    wherein the body includes an upper section and a lower section;
    wherein the upper section and the lower section of the body form a J shape profile;
    wherein pitches and coil angles of the coils in the upper section are consistent to form an upright profile for the upper section;
    wherein pitches and coil angles of two or more coils at a free end of the lower section is differed from the pitches and the coil angles of the coils in the upper section to form a gradually curved profile for the lower section;
    wherein the coil angles of the two or more coils at the free end of the lower section is greater than the coil angles of the coils in the upper section;
    wherein the pitches of the two or more coils at the free end of the lower section is greater than the pitches of the coils in the upper section;
    wherein the upright profile of the upper section includes a first axis that aligns with a vertical reference line, while the gradually curved profile of the lower section includes a second axis that tangentially diverges from the vertical reference line; and
    wherein the J-shape profile generates increased lateral force while ensuring even gap between coils at the lower section during compression to eliminate interference between adjacent coils.

2. The coil spring according to claim 1, wherein each coil angle of the two or more coils at the free end of the lower section differs from each other.

3. The coil spring according to claim 1, wherein each pitch of the two or more coils at the free end of the lower section differs from each other.

4. A front vehicle suspension system comprising a coil spring as claimed in claim 1.

* * * * *